Sept. 22, 1964     F. SOLARI     3,149,780

COUNTING APPARATUS WITH AUTOMATIC ZERO SETTING

Filed Aug. 15, 1960     5 Sheets-Sheet 1

*INVENTOR.*

BY FERMO SOLARI

Albert L. Jeffers

ATTORNEY

Sept. 22, 1964    F. SOLARI    3,149,780
COUNTING APPARATUS WITH AUTOMATIC ZERO SETTING
Filed Aug. 15, 1960    5 Sheets-Sheet 2

INVENTOR.
BY FERMO SOLARI
Albert L. Jeffers
ATTORNEY

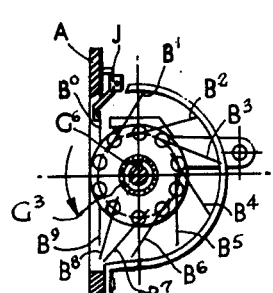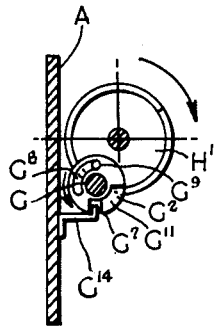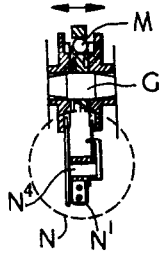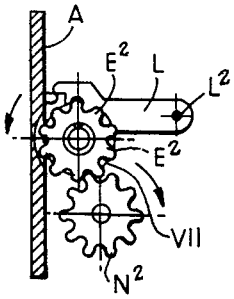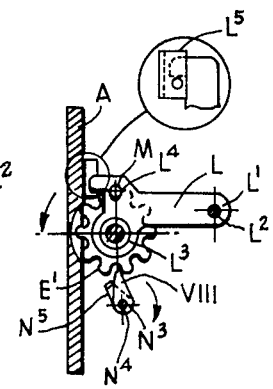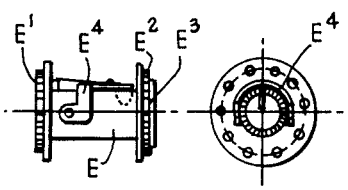

Sept. 22, 1964 F. SOLARI 3,149,780
COUNTING APPARATUS WITH AUTOMATIC ZERO SETTING
Filed Aug. 15, 1960 5 Sheets-Sheet 4

*INVENTOR.*
BY FERMO SOLARI
*ATTORNEY*

INVENTOR.
BY FERMO SOLARI
ATTORNEY

United States Patent Office 3,149,780
Patented Sept. 22, 1964

3,149,780
COUNTING APPARATUS WITH AUTOMATIC
ZERO SETTING
Fermo Solari, Via Florio 6, Udine, Italy
Filed Aug. 15, 1960, Ser. No. 49,640
8 Claims. (Cl. 235—144)

The present invention relates to an automatic counting and totaling apparatus and, more particularly, one intended to be controlled by means of electric pulses.

It is known that there are already a large number of devices provided with means generating electric pulses intended to effect the counting and totaling of their operations. For example: in machine tools, presses, etc., for the control of time units in telephone calls, for the cycles of assembly lines, etc. There are pulse distributors (determining the numerical succession of any operation, including the order of the customers to be served in banks, stores, etc.), to effect the registration of quantities of any material distributed or sold, and the sums to be paid for these quantities, and there are also devices for measuring fluids such as gasoline, generating magnetic pulses or the like which correspond to units of quantity and price, or of each separately; or pulses which must be counted electronically or electromechanically in order to obtain units corresponding to what is to be indicated.

The present improvement is applicable particularly to the above stated devices, as well as to others, and therefore it is only by way of example that reference will be made to an apparatus which serves for the distribution of gasoline or other liquid and in which it is desired in the first place to register the number of units sold and the corresponding amount, which registration is later automatically cancelled when the information is no longer of interest.

In order to limit this example to the improvement and to the particularities which chiefly and more precisely constitute the subject of the patent of invention, it will be assumed that a pulse is available for every unit of quantity and price, respectively, the first pulse always having the same direction, for the quantity as well as for the price, and the pulses together forming polarized pulse trains which, by means of an apparatus which is the subject of the invention, permits the registration of the quantity and of the price at variable speeds.

An object of this invention is to provide an automatic counting and totalizing apparatus having indicators which will provide a large reading surface in a relatively small area, which provides a reading surface approximately six times larger than the reading surface area of the present disk type systems which are used for gasoline dispensers.

One of the objects of this invention is to provide a counting and totaling apparatus having a remote controlled zero setting device, and is adapted to be actuated by an electrical measuring mechanism which can be located separately from the counting and totaling apparatus.

A further object of the invention is to provide a counting and totaling apparatus which can be operated by a stepping device such as a multiple pole electromagnet having a rotating armature, or by a relay motor, or by a servomotor, or the like.

Another object of the invention is to provide an automatic counting and totaling apparatus wherein the advance of the indicators can be obtained with any step by step advancing device such as a multiple pole electromagnet with rotating armature, or by a relay motor, or by a servomotor, or the like.

A still further object of the invention is to provide an automatic counting and totaling apparatus wherein all computing movements are effected with displacements of the number rollers and of their drive mechanisms by approximately 36 degrees with the evident advantage that many of the difficulties caused by progressive advance of the number rollers are eliminated, and in particular that of showing the successive units simultaneously, for example, the passage from 9 to 0 wherein the first number roller will transfer the next number roller.

A still further object of this invention is to provide an automatic counting and totaling apparatus wherein the roller indicators of the totalizer are always engaged in that all the roller indicators are mechanically interconnected from one bank to the next thus preventing erroneous readout or indications.

Another object of the invention is to provide an automatic counting and totaling apparatus having a simplified zero setting means for the roller indicators which is included directly in the supporting structure of the roller indicators.

The improvement concerns lastly the characteristics of construction, combination, and arrangement of the parts, together with the use of another mechanism of very recent invention of the same applicant, such as the electromagnet with rotating armature and with multiple poles for the actuation of pallet type numeral wheels or the like on teleindicator devices Patent No. 3,077,302, and of improved pallet type numeral wheels.

It is outstanding moreover, for the simplicity and economy of its construction and assembly and for the relatively small number of these parts, and of course there will be chosen for the construction of the apparatus the materials most appropriate for their weight, mechanical strength, appearance, and cost.

The invention is described below and illustrated in the annexed drawings, in which:

FIG. 7 shows section II—II' of FIG. 4;

FIG. 8 shows section III—III' of FIG. 4 with cam device for zero setting;

FIG. 9 shows section IV—IV' of FIG. 4 with the transfer pinion gear;

FIG. 10 shows section V—V' of FIG. 4, with the transfer pawl of the successive pallets and the blocking device;

FIG. 11 shows sections IV—IV' and V—V' viewed from the back of the lever and ball of the advance;

FIG. 12 shows a detail view of the pallet type numeral wheel with the pawl engaged for the transfer viewed in perspective and in section;

For easy understanding of the mechanical functioning of the apparatus there will first be given a brief description of the parts and of some of their particularities illustrated in FIGURES 1 to 18.

Figure 1:
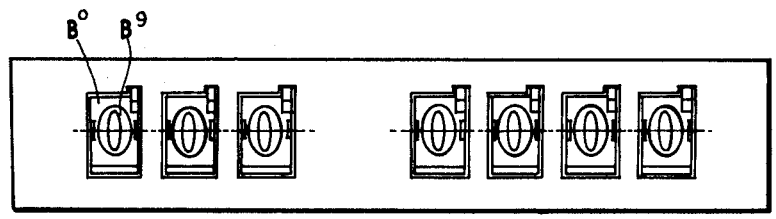
FIG. 1, shows a front view of the apparatus with two groups of indications on the same shaft—one intended for the quantity and the other for the price.
Figure 2:
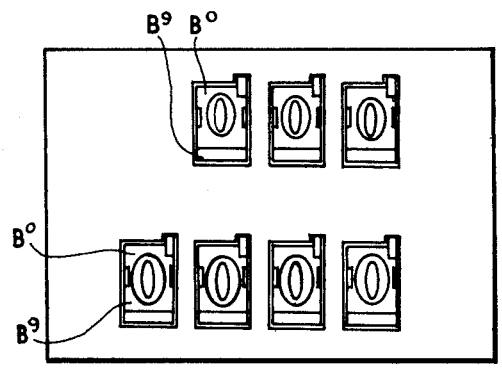
FIG. 2, shows the same two indications as per FIG. 1, mounted on two different shafts.
Figure 3:
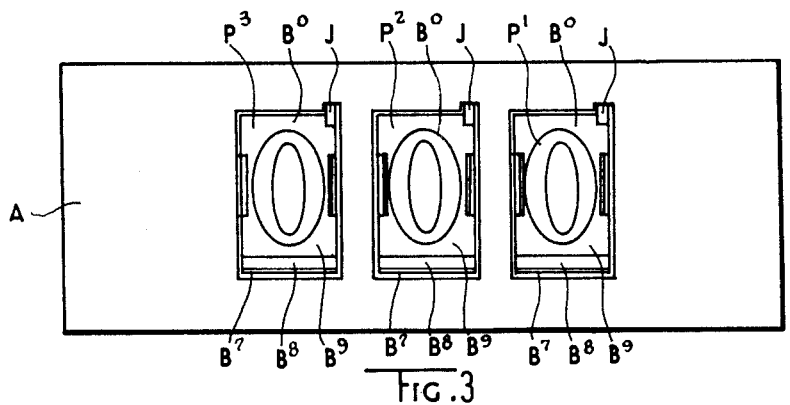
FIG. 3, shows a front view of an indicator device of three numbers.

The panels represented in FIGURES 1, 2 and 3, are identical in their principle, with the only difference that the number of windows or their arrangement is different, so that when referring to the characteristics of the panel or element represented in FIG. 3 and following, it is understood that these characteristics refer also to panels 1 and 2, as well as to others having any number of indications and any position thereof.

Panel A, represented in FIGURES 3, 4, 5, 6, 7, 8, 9 and 10, comprises: at A/1 two supports intended to receive the central supporting and reset shaft G of the pallet type numeral wheels and the shaft of the interlock system of the shaft L/2; at A/2 an end-of-stroke support which sustains the pressure on the spring G/8 of the zero setting shaft; at A/3 a support which, with A/1, centers the zero setting cam H/1.

The two half-pellets B/0 and B/9 are well visible in front view in FIGURES 1, 2 and 3, while, again in front view, there is seen the lower part of pallets B/8 and B/7, which will appear in the upper part of the back of the pallet after 7 and 8 advance movements, respectively. The ten half-pallets B/0 to B/9, on which the numbers are inscribed, from both sides to form in pairs the numbers from 0 to 9, are well visible in section II—II' of FIG. 7.

Figure 4:
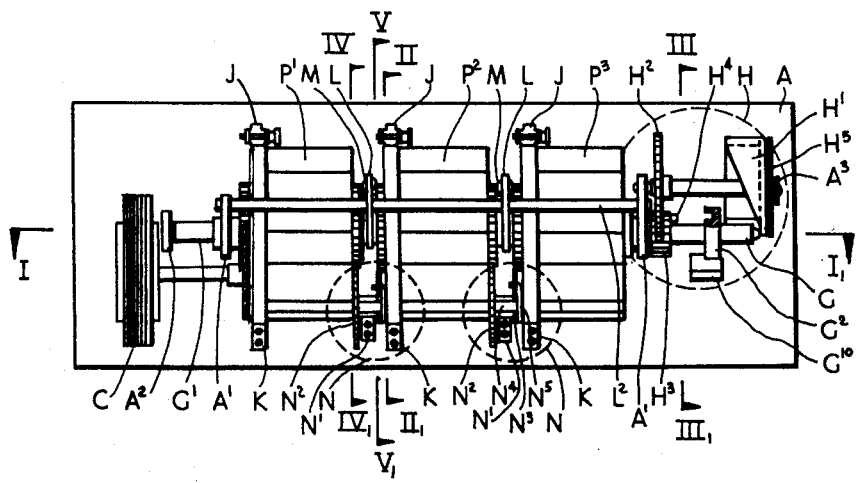
FIG. 4 shows FIG. 3 viewed from behind.
Figure 5:
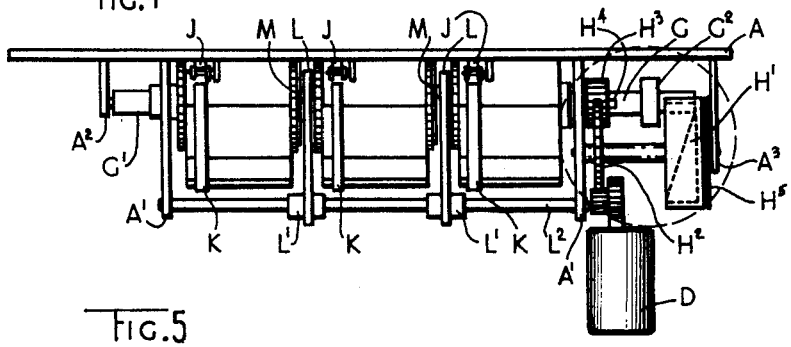
FIG. 5 shows FIGURES 3 and 4 viewed from the top.

In FIGURES 4 and 5 the pallets are seen in their arrangement on the wheel, under different angles, while in all the other figures the pallets have been omitted to permit a clearer view of the supplementary devices.

Figure 15:
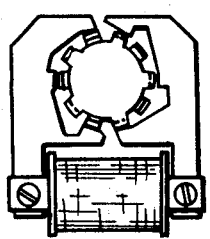
FIGURES 15, 15a, 15b show the working diagram of the electromagnet with rotating armature.
Figure 15A:
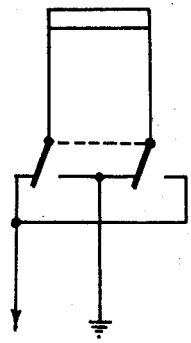
Figure 15B:
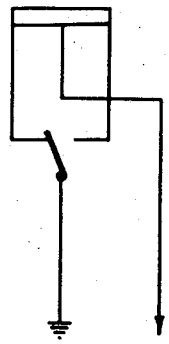

An electromagnet C with rotating armature and multiple poles for transfer or stepping the wheel, the subject of applicant's co-pending application S.N. 49,641, filed August 15, 1960, is shown in FIGURES 4 and 15, and it constitutes the advancing transfer stepping mechanism where each pulse has the effect of rotating the rotor by about 36 degrees.

The above rotary polarized electromagnet can evidently be replaced by another step-by-step advancing device, for example, by a reciprocating movement advancing electromagnet, which causes a ratchet wheel to advance through a pawl, and as this wheel is divided into ten positions of advance, there are likewise obtained 36 degrees of rotation, but these advancing devices are not further described as they are considered known, and also the reset motor, represented by D in FIG. 5, is a D.C. or A.C. motor of any kind and is therefore not described.

The wheel E of the pallets is well visible in FIG. 12, and is formed by a cylinder provided with two gears E/1 and E/2, by a cam E/3 and by a movable pawl E/4 which is held in position by a steel blade which forms a spring. It is evident that the last pallet wheel, that is, that for the hundreds in the case of 3 wheels need not be provided with the cam E/3 and with the gear E/2.

Figure 6:
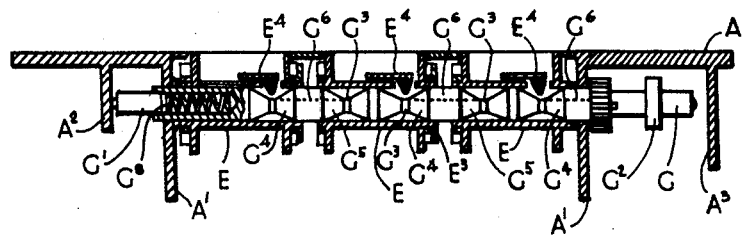
FIG. 6 shows section I—I' of FIG. 4 viewed with the central shaft and the ratchets of the pallets.

The shaft G, the main support of the pallet wheels and working mechanism in the zero setting, is well visible in FIG. 6.

Part G/1 of this shaft is formed by a prolongation under tension by means of a spiral spring G/8, which is located in a longitudinal hole at one end of shaft G.

Disk G/2, integral with shaft G, is a transfer device by means of the pin H/4 and is also a detent and end-of-stroke abutment by means of its opening G/7, as shown in detail in FIG. 8.

The parts G/4 of truncated cone form as per FIG. 6, serve to raise or lower the pawls E/4 when the shifting of shaft G occurs, and this for all indications of the number wheels, except for the 0 indication in which the pawls E/4 insert themselves in the circumferential groove G/6 of the shaft, the groove being visible in section in FIG. 7.

The parts G/5 of truncated cone form as per FIG. 6, serve to disengage the special levers L retaining the balls M, a detail better visible in FIG. 10.

The thin parts G/3 of shaft G as per FIG. 6 serve to release the pawls E/4 of the pallet wheels E during the transfer, and to release also the levers L which retain the balls M during the zero setting operation.

The zero setting device H as per FIGURES 4, 5, and 8 is formed by a cam H/1 with a plane inclined about 160 degrees on its perimeter, with 180 degrees, in flat high position and 20 degrees in flat low position; and it is driven by motor D through gear H/2. Gear H/3, loose on shaft G, has as particularity the pin H/4 which, at the moment of the camming in or transfer of G/2, takes along shaft G in the same direction of rotation.

Figure 16:
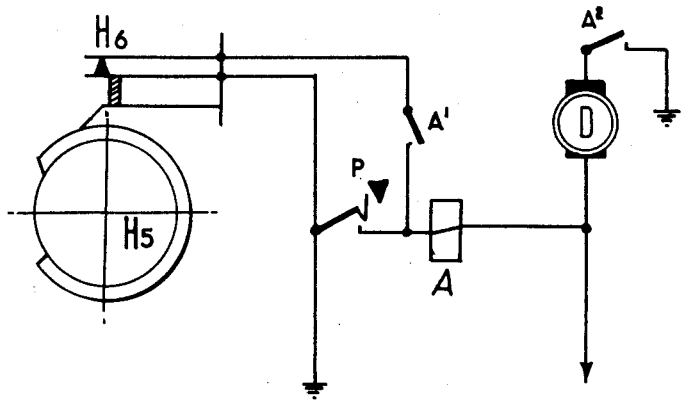
FIG. 16 shows the zero setting diagram.

Cam H/5 is superposed on cam H/1 and is intended to reverse or open the contact H/6 which serves—as shown in FIG. 16—to connect and disconnect the motor D.

The counterweight pawls J serve to counterbalance the weight of the pallets, at rest and in operation, and they are visible in FIGURES 3, 4, 5 and in the section of FIG. 7.

The bows K as per FIGURES 4, 5 and 7 serve as support for a part of the pallet in motion and in combination with the pallet wheels and counterweight pawls they have other functions which are dealt with in applicant's co-pending application, S.N. 49,604, filed August 15, 1960.

The levers L serve for the displacements of the blocking balls M—as is seen in FIGURES 4, 5, 9, 10 and 11— and their point of constant support is formed by L/1 around shaft L/2; their fixed or movable point of support is formed by L/3 according to the position of shaft G, L/4 constitutes the seat of the ball, while L/5 constitute the guides of the levers L, which are well visible in detail in FIG. 10.

The transfer device N from a wheel of one unit to a next wheel appears in FIGURES 4, 9, 10 and 11. N/1 constitutes the support which is fastened on panel A; N/2 constitutes the transfer gear which is driven by gear E/2 for the next wheel; N/3 is the transfer pawl which drives the pallet wheel of the next unit, and it is loose on shaft N/4 and caused to carry out an operation by the point of support N/5 fixed on shaft N/4.

Figure 14:
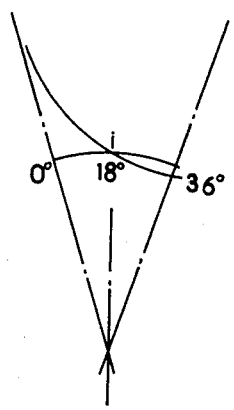
FIG. 14 shows a detail view of the progression curves of the transfer pawl.

FIG. 14 illustrates the curve of progression of pawl N/3 which causes the gear E/2 to advance with a differential angle progression, in such a way that the tolerances between several wheels are shifted toward the end of a step of 36 degrees.

Figures 13, 13A:
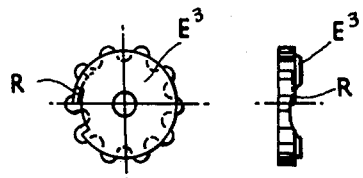
FIGURES 13-13a show a detail view of the blocking cam.

The steel blade R acts as spring on cam E/3 for the position of the numbers 9 in the pallet wheels and is well visible in FIG. 13. It is arranged on cam E/3 so as to leave for the latter a free opening slightly greater than 36 degrees and a relatively free opening through the position of blade R over a course of 18 degrees preceding the said 36 degrees.

The pallet wheels as functional units are marked P/1 for the units' digits, P/2 for the tens, and P/3 for the hundreds, as is seen in FIGURES 3 and 4.

A description will now be given of the mechanical system of operation of the counter and totalizer, and of the system of zero setting.

The electromagnet C produces step-by-step displacements of roller P/1.

Gear E/2 is integral with this wheel and drives the transfer gear N/2 which in turn drives the point of pawl driving arm N/5 by means of shaft N/4, while N/5 drives the pawl N/3, as per FIGURES 4, 10, and 11.

After nine displacements starting from 0, wheel P/1 indicates the number 9, obtained with the combination with the combination of the pallets B/9 above and B/8 below.

The next advance by one step of about 36 degrees has the result that pawl N/3 moves gear E/1 of the pallet wheel P/2 with an equal movement, while ball M, held in its position by the steel blade R of cam E/3, finds progressively a free passage in the space of displacement of 36 degrees in the cam of wheel P/1 and is forced into this passage by the pressure exerted thereon by gear E/1 of wheel P/2 which has simultaneously been set in motion by P/1, N/2, N/3 and N/5. In this way wheel P/1 is returned to 0, while roller P/2 is advanced by a single step, because at the end of this step wheel P/2 is again blocked by ball M, which has returned to its initial position by means of cam E/3 at the end of the 36 degrees of the tenth step of P/1.

The same succession of operations takes place between the wheels P/2, P/3 and any successive other wheels, and this always during and through the displacement of wheel P/1 at its tenth step or tenth advance by 36 degrees but of course in the order in which the tens, hundreds, thousands, etc. succeed each other.

It is evident, and it is shown in particular in FIGURES 9, 10 and 11, that the lever L for the displacements of ball M is fixed by means of the shaft G at rest, and that the shaft is not in rotation, because its rotation occurs only during the operation of zero setting.

The characteristic that pawl N/3 is partially loose on its shaft does not form part of this operation and serves only in certain coincidence of zero setting.

From the transfer operations is derived mainly the lateral displacement of ball M, caused by the alignment which causes this movement to take place simultaneously with the transfer of P/1 and P/2 or other wheels, as cam E/3 of the wheel of the lower unit blocks ball M in gear E/1 of the wheel of the upper unit in the space of about 324 degrees and permits the advance of the wheel of the upper unit only during the time required for this transfer, to block it immediately thereafter and to prevent the kinetic effect which wheel P/2 has acquired during its advance.

The working curve of pawl N/3, observable in FIG. 14, has the purpose of increasing the speed of transfer of wheel P/2 in relation to P/1, so as partially to regain in time the tolerances inherent in all mechanical transmissions.

The electrical diagram for the zero setting is illustrated in FIG. 16.

A push-button p serves for the control of the zero setting and may be mounted at any point, connected to the apparatus by two wires. Relay A is mounted in the apparatus and has two working contacts: A/1 and A/2; cam H/5 is fastened on cam H/1 of the zero setting device; contact H/6, normally closed, is fixed near H/5 in such manner that it is actuated by the passage of H/5. Relay A pulls up through the following circuit: Negative, winding of A, pushbutton p to ground. The push-button p, having been released, relay A is maintained through the following holding circuit: Its working contact A/1 closed, contact H/6 normally closed, ground. Motor D has simultaneously been energized through ground contact A/2 closed, winding of motor D negative.

On completion of a complete revolution, cam H/5 normally opens contact H/6, relay A falls and cuts off the current supply of the motor through contact A/2 fallen again, while contact H/6 closes immediately thereafter, by the kinetic force of cam H/1 driven by motor D. The open position of cam H/5 of contact H/6 corresponds to the return position of reset shaft G after a complete rotation, that is, upon alignment in point G/2 of the opening G/7 opposite the fixed point G/10.

The zero setting is therefore completed and the circuit is again ready for another operation.

The control push-button p may be rendered inoperative by means of an electric circuit until after a new operation, and this in order to avoid the possibility of zero setting while the apparatus is in opeartion as totaling device.

Simultaneously with the electrical operation the following mechanical sequence takes place.

Figure 17:
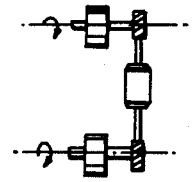
FIG. 17 shows the mechanical connection for the zero setting of two indications as per FIG. 2.
Figure 18:
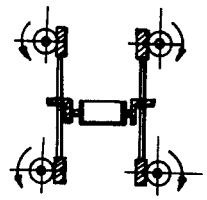
FIG. 18 shows the mechanical connection of the zero setting for a double-faced apparatus viewed from the side.

Motor D drives gear H/2 (or the gears H/2 in the case of arrangements of groups of indications mounted as in FIGURES 17 and 18) which progressivvely rotates from 0 to about 140 degrees, from its initial point, driving in a displacement of the same angle cam H/1. The latter in turn, with its inclined plane, shifts the central shaft G, sideways, which cannot yet turn since it is guided at the fixed point G/10 by the opening G/7 of its part G/2, as it seen in detail in FIG. 8 and also in FIGURES 4 and 5.

The spiral spring G/8 as per FIG. 6, is compressed by this movement and therefore has available a pressure which enables it to return to its starting point.

A subsequent progressive rotation of gear H/2 has the purpose of releasing shaft G in its part G/2 from the fixed point G/10, while point G/9 fixed in this part G/2 is carried on the same plane as point H/4 of wheel H/3 mounted loose on shaft G.

During this time the lateral displacement of shaft G has had the effect of:

(1) Bringing the pawls E/4 of the supporting wheels E common to the pallets into groove G/6 of shaft G for the wheels still on zero, or into any of the other nine positions still possible on shaft G for the pawls E/4, in relation to any of the numbers 1 to 9;

(2) bringing to the center of the levers L the thin part of shaft G in position G/3; this is seen in FIG. 6.

At this point the continued rotation of H/2, always driven by motor D, has the purpose of bringing panel H/4 of the loose wheel up to point G/9 of disk G/2. After this alignment, shaft G also starts a movement of rotation in the opposite direction of that of cam H/1, that is, in the same direction of rotation as the pallet groups P/1, P/2, and P/3. At the end of a complete revolution, shaft G automatically returns to its initial position by means of the alignment of its opening groove G/7 in its part G/2 with the external fixed point G/10. This alignment is progressively brought by a curve visible in FIG. 8 to point G/11.

The tension of spring G/8 brings the shaft back to its initial position, while cam H/1, has resumed its low position a few degrees before this alignment.

During the rotation of shaft G by a complete revolution, consecutive drives have taken place:

(1) The wheel P/1, P/2 and P/3, which at first were on number 0, have been driven in the same movement of rotation, as the pawl or pawls E/4 have found the groove G/6, after which the lateral movement of shaft G has been carried out;

(2) Successively all wheels P/1, P/2 or P/3 have been driven in each case starting from any initial position from 1 to 9; in fact, the pawl or pawls E//4 have been in alignment with groove G/6 of shaft G, which in its rotation has omitted the pawl E/4 to drop into the groove G/6. It follows, therefore, that the pawl or pawls E/4 have engaged in shaft G by means of groove G/6, and the wheels P/1, P/2 or P/3 have been driven by as many complementary positions to the position on which the computation stopped at the end of the operation. By means of their complementary position they have, therefore, been reset to zero.

It is understood that the end and the beginning of this operation are controlled electrically, as described above in the electrical diagram.

Concerning other particularities which are not evident from the description made of the zero setting, the following details are noted:

(a) Shaft G would have been able to drive by friction during its rotation one or more wheels P/1, P/2 or P/3 if it were not still engaged by pawl E/4. In order to avoid this movement of the wheels P/1, P/2 and P/3 by means of the friction of shaft G, the following brake means has been adopted: Wheel P/1 drives the rotor of the rotary electromagnet C, and the magnetic flux between the rotor and the stator forms a greater friction than that between shaft G and the core of P/1. For the other wheels P/2 and P/3 the levers L are fixed at their point L/1 on the shaft L/2, while they are free to execute vertical upward movements at their point L/3. The balls M thus exert a pressure on gear E/1, and this pressure will be overcome with the drive of E/1 subsequent to the engagement of pawl E/4 in the groove of shaft E/6 and will allow the levers L to carry out an upward arc movement in relation to the points of support L/1.

(b) The earlier drive of P/3 in relation to P/2, or of P/2 in relation to P/1, is due to another effect which will be described here, considering only the drive of P/2 in relation to P/1, and limiting the example to only one of the possible cases. P/1 is in the position of number 9 seen from the front, P/2 is on position 0. It results therefrom that P/2 is driven directly by shaft G, while P/1 must still remain at rest. For that purpose pawl N/3 is mounted loose in the sense that it can be driven freely by gear E/1 while N/5 and N/2 are still at rest. During the advance of wheel P/2, its gear E/1 exerts a pressure against ball M, which causes the steel blade R of cam E/3 of wheel P/1 to yield, again still inoperative until its pawl E/4 coincides with the groove G/6.

Without this particularity, wheel P/2 would have driven wheel P/1 forward by one step, and gear E/1 of P/2 would produce for each advance by one tooth a pressure on N/3 and thus indirectly permit a carryover of P/1.

I claim:

1. In an automatic counting and totalizing apparatus for a fuel dispenser comprising, in combination:
    (a) a central shaft adapted to support a number of rotatable indicator wheels adapted to provide a large reading surface in a relatively small area;
    (b) first connecting means for rotating the first indicator wheel,
    (c) a first electrical means responsive to pulses for operating the first connecting means,
    (d) second connecting means cooperating with the first indicator wheel for rotating the second indicator wheel a predetermined distance,
    (e) said central shaft provided with spaced circumferential grooves;
    (f) said indicator wheels having a pawl adapted to be positioned in the spaced radial grooves,
    (g) said central shaft provided with a longitudinal slot,
    (h) second electrical means for rotating the central shaft including cam means for shifting the shaft laterally so that each indicator pawl will be received in the slot to rotate the indicator wheels a predetermined distance.

2. In a counting apparatus as set forth in claim 1 wherein the indicator wheels include a flap member for displaying numbers which are substantially six times greater in size than ordinary cylinder indicators.

3. In a counting apparatus as set forth in claim 1 wherein said connecting means for advancement includes a ball and cam provided with a curved portion for progressively releasing the ball for the duration of a predetermined angle of rotation.

4. In an automatic counting and totalizing apparatus for a fuel dispenser comprising, in combination:
    (a) a central shaft adapted to support a number of rotatable indicator wheels,
    (b) electrical means responsive to pulses including connecting means for rotating the wheel of the lowest order a predetermined distance,
    (c) transfer means for rotating the wheel of the next higher order a predetermined distance,
    (d) said central shaft provided with spaced circumferential grooves,
    (e) said indicator wheels having a pawl adapted to be positioned in the spaced circumferential grooves,
    (f) said central shaft provided with an axial slot,
    (g) means for shifting the central shaft laterally a predetermined distance so that each indicator pawl will be received in the axial slot to reset the indicator wheels to a zero position when the shaft is rotated, and
    (h) control means for actuating the shifting means.

5. In a counting apparatus as set forth in claim 4 wherein the connecting means includes an advancing pawl which is mounted to move freely in one of its directions of rotation to render the connecting means inoperative.

6. In a counting apparatus as set forth in claim 4 wherein the means for shifting the central shaft includes a motor driven cam means adapted to engage the shaft to rotate it substantially 360 degrees, and spring means for returning the shaft to its starting position after it has completed one rotation.

7. In a counting apparatus as set forth in claim 4 wherein the connecting means includes a lever and ball for advancing the indicator rollers and serves as a brake means to prevent overtravel of the indicator rollers during the reset operation.

8. In a counting apparatus as set forth in claim 4 wherein the connecting means includes a gear train, a cam and ball means associated with the gear train, said cam and ball means adapted to lock the indicator roller next in higher order during substantially 324 degrees of rotation of the first indicator roller and permits simultaneous rotation of the two indicator rollers during the next 36 degrees of rotation.

References Cited in the file of this patent

UNITED STATES PATENTS

| | | |
|---|---|---|
| 1,354,778 | Pitman | Oct. 5, 1920 |
| 1,400,197 | Wood | Dec. 13, 1921 |
| 1,863,926 | Kleine | June 21, 1932 |
| 2,024,598 | Powers | Dec. 17, 1935 |
| 2,440,665 | Jeffrey | Apr. 27, 1948 |
| 2,544,610 | Nelson | Mar. 6, 1951 |
| 2,561,709 | Elms | July 24, 1951 |
| 2,568,709 | Bliss | Sept. 25, 1951 |
| 2,673,686 | Hoffman | Mar. 30, 1954 |
| 2,833,067 | Moller | May 6, 1958 |
| 2,932,448 | Bliss | Apr. 12, 1960 |
| 2,980,329 | Hoffman | Apr. 18, 1961 |
| 3,070,300 | Ambrozaitis | Dec. 25, 1962 |

UNITED STATES PATENT OFFICE
CERTIFICATE OF CORRECTION

Patent No. 3,149,780                          September 22, 1964

Fermo Solari

It is hereby certified that error appears in the above numbered patent requiring correction and that the said Letters Patent should read as corrected below.

Column 6, line 23, for "panel" read -- pawl --; column 7, line 38, for "radial" read -- circumferential --.

Signed and sealed this 19th day of January 1965.

(SEAL)
Attest:

ERNEST W. SWIDER
Attesting Officer

EDWARD J. BRENNER
Commissioner of Patents